US011064219B2

(12) United States Patent
Sneyers

(10) Patent No.: US 11,064,219 B2
(45) Date of Patent: Jul. 13, 2021

(54) IMAGE FORMAT, SYSTEMS AND METHODS OF IMPLEMENTATION THEREOF, AND IMAGE PROCESSING

(71) Applicant: CLOUDINARY LTD., Petah Tikva (IL)

(72) Inventor: Jon Sneyers, Asse (BE)

(73) Assignee: Cloudinary Ltd., Petah Tikva (IL)

( * ) Notice: Subject to any disclaimer, the term of this patent is extended or adjusted under 35 U.S.C. 154(b) by 0 days.

(21) Appl. No.: 16/702,453

(22) Filed: Dec. 3, 2019

(65) Prior Publication Data

US 2020/0252655 A1    Aug. 6, 2020

Related U.S. Application Data

(60) Provisional application No. 62/774,721, filed on Dec. 3, 2018.

(51) Int. Cl.
*H04N 19/91* (2014.01)
*H04N 19/44* (2014.01)
*H04N 19/60* (2014.01)

(52) U.S. Cl.
CPC .............. *H04N 19/91* (2014.11); *H04N 19/45* (2014.11); *H04N 19/60* (2014.11)

(58) Field of Classification Search
None
See application file for complete search history.

(56) References Cited

U.S. PATENT DOCUMENTS

| 6,236,761 | B1 * | 5/2001 | Marchand | G06F 17/145 382/248 |
| 6,421,463 | B1 * | 7/2002 | Poggio | G06K 9/00228 382/224 |
| 9,418,310 | B1 * | 8/2016 | Chen | G06K 9/036 |
| 2006/0210156 | A1 * | 9/2006 | Lei | H04N 19/60 382/166 |
| 2006/0269167 | A1 * | 11/2006 | Venkatesan | G06K 9/469 382/305 |
| 2006/0291736 | A1 * | 12/2006 | Hou | G06F 17/147 382/250 |
| 2007/0019873 | A1 * | 1/2007 | Tzannes | H04N 19/147 382/239 |
| 2007/0201754 | A1 * | 8/2007 | Li | G06K 9/527 382/240 |
| 2008/0284788 | A1 * | 11/2008 | Ando | H04N 19/91 345/557 |
| 2009/0141994 | A1 * | 6/2009 | Stevens | H04N 19/176 382/237 |
| 2009/0315905 | A1 * | 12/2009 | Lu | H04N 19/13 345/555 |
| 2009/0324079 | A1 * | 12/2009 | Yuan | G06K 9/325 382/176 |
| 2010/0329352 | A1 * | 12/2010 | DeCegama | H04N 19/85 375/240.19 |

(Continued)

*Primary Examiner* — Stefan Gadomski
(74) *Attorney, Agent, or Firm* — Phillips Lytle LLP; David L. Principe

(57) ABSTRACT

There is disclosed herein a method of encoding an image file, the method comprising inputting dimension, channel, bit depth and color model data of the image file; forward transforming the image file; entropy coding the image file; inverse transforming the image file; and, reconstructing the image file.

3 Claims, 3 Drawing Sheets

(56) References Cited

U.S. PATENT DOCUMENTS

| | | | | |
|---|---|---|---|---|
| 2011/0141310 A1* | 6/2011 | Alacoque | ............... | H04N 19/63 |
| | | | | 348/222.1 |
| 2011/0243380 A1* | 10/2011 | Forutanpour | ........... | G06F 3/017 |
| | | | | 382/103 |
| 2011/0249867 A1* | 10/2011 | Haas | .................... | G06K 9/6257 |
| | | | | 382/103 |
| 2013/0148880 A1* | 6/2013 | Kennedy | .................. | G06K 9/62 |
| | | | | 382/159 |
| 2013/0272422 A1* | 10/2013 | Lee | ..................... | H04N 19/122 |
| | | | | 375/240.18 |
| 2013/0301889 A1* | 11/2013 | Abramoff | ................ | G06K 9/00 |
| | | | | 382/128 |
| 2015/0249828 A1* | 9/2015 | Rosewarne | ............ | H04N 19/60 |
| | | | | 375/240.02 |
| 2015/0348458 A1* | 12/2015 | Tian | ..................... | G09G 3/2007 |
| | | | | 345/690 |
| 2016/0042246 A1* | 2/2016 | Herrmann | ................. | B60R 1/00 |
| | | | | 382/190 |
| 2016/0088313 A1* | 3/2016 | Fenney | ................. | H04N 19/192 |
| | | | | 382/234 |
| 2017/0039444 A1* | 2/2017 | Li | ......................... | G06K 9/4647 |
| 2017/0164009 A1* | 6/2017 | Decegama | ............. | H04N 19/63 |
| 2018/0098727 A1* | 4/2018 | Spahn | ................... | G01J 5/0025 |
| 2018/0204132 A1* | 7/2018 | Liang | ..................... | G06N 7/005 |
| 2018/0357769 A1* | 12/2018 | Roth | ..................... | G06K 9/4604 |
| 2019/0110056 A1* | 4/2019 | Fenney | ................. | H04N 19/423 |
| 2020/0104979 A1* | 4/2020 | Czerwik | .............. | H04N 19/172 |
| 2020/0349411 A1* | 11/2020 | Luo | .......................... | G06N 3/08 |

* cited by examiner

IMAGE FORMAT, SYSTEMS AND METHODS OF IMPLEMENTATION THEREOF, AND IMAGE PROCESSING

CROSS-REFERENCE TO RELATED APPLICATIONS

This Application claims priority to U.S. Provisional Patent Application No. 62/774,721 filed on Dec. 3, 2018, the contents of which are hereby incorporated herein in their entirety.

BACKGROUND

One goal of image formats is to make delivery of images more efficient. Specifically, one-to-many delivery of images in a bandwidth-constrained context, e.g., images on websites. There is also an increasing variety in end-user viewing devices and network conditions: from tiny smartwatch screens, over a spectrum of screen sizes and display resolutions of phones, tablets, to laptop and desktop computer screens, and 4K or 8K televisions or beamers; from slow 2G or 3G with poor reception to ultra-fast connections. It is not acceptable to create websites or applications that assume some given viewport width, but rather Responsive Web Design (RWD) has become the standard.

Known approaches to RWD include creating a variety of downscaled images for each high-resolution 'master' image, and then sending the 'correct' image to every end-user. This approach helps to reduce unnecessary bandwidth consumption—e.g., a 4000 pixel wide image would not suit a smartwatch—but it has downsides. Downscaled variants must be created and stored somewhere, and if a Content Delivery Network (CDN) is used, the multiplication of files to be delivered has a negative impact on cache behavior as well. Also, it can be hard to avoid that an end-user ends up downloading several variants of the same image, e.g., when their viewport width changes because of a browser window resize or a phone that gets rotated. From the point of view of web developers, RWD is a major challenge; many non-trivial decisions must be made: e.g., how many variants are needed, and at what sizes? What sort of infrastructure is needed to create and manage them?

In addition to the needs of RWD, there is also an increasing attention to the time it takes to load a web page or otherwise deliver content, and to obtain at least the user perception of a "snappy" experience. Low-quality image placeholders (LQIP), thumbnail galleries, and progressive rendering are methods to get previews on the screen before the entire image has been downloaded.

Considering the above, there is a need to provide an image format that is "Responsive by design". This means, for example and without limitation, that one single file can be used instead of many downscaled variants. Truncating this single 'master' file to various offsets produces downscaled or different quality versions of the same image. This requires an image format that is essentially pyramidal, encoding the image from low resolution to high resolution, or from low frequency to high frequency.

It is known in the JPEG format to provide the option to use progressive scan scripts; e.g., reasonable scale 1:8, 1:4 and 1:2 previews can be produced by truncating a progressive JPEG with a suitable scan script. Hierarchical JPEG and JPEG 2000 took it even further than that with browsers rendering JPEGs progressively.

However, most more recent image formats have abandoned progressive decoding. WebP, BPG or HEIC (HEIF with a HEVC payload) and AVIF cannot be decoded progressively; truncating a file will produce just the top part of the image. This is perhaps to some extent an unfortunate side-effect of the fact that these image formats were derived from video codec intra-frame bitstreams, and in the context of video, progressive decoding of an individual frame is not really a useful notion.

As such, one skilled in the art will appreciate that progressive decoding and the needed "responsive by design" differ in at least some significant aspects. For example, progressive decoding originates from an era when viewing environments were pretty much the same for everyone: low bandwidth and display resolution of 800×600 (or later 1024×768, etc.). Everyone is supposed to get the same final image (i.e., the entire file), but it is nice to get a preview while the data slowly arrives. By contrast, and by way of non-limiting example, "responsive by design" implies that different people get a different final image (depending on the resolution they need); progressive rendering of a "responsive by design" format is always possible, but if the network is fast enough (or, for example, if the image is "below the fold"), it may not be necessary to actually do that. "Responsive by design" is more than "progressive": it has to be possible to get exact downscaled images from truncated files, there has to be some mechanism to find out where to truncate, and at the different truncation offsets, good trade-offs between compression density and image quality can be reached.

It is also notable that JPEG has significant limitations, especially the subset of the format that has been implemented in browsers and thus became the de facto standard. JPEG has a relatively verbose header, so it cannot be used (at least not as-is) for LQIP where a byte budget of a few hundred bytes is required. It cannot encode alpha channels (transparency), it is restricted to 8-bit per channel, and its entropy coding does not meet contemporary expectations. JPEG is also not "responsive by design": there is no easy way to find the truncation offsets and it is limited to a 1:8 downscale (the DC coefficients), while if we want to use the same file for an 8K UHD display (7680 pixels wide) and for a smart watch (e.g. 320 pixels wide), this downscale is insufficient. Hierarchical JPEG can cover a wider range of scaling factors, but the overall compression of the full-resolution image tends to be worse, since the total number of pixels to be encoded is larger.

As such, there is a need for improvements in image formats, related technical infrastructure and solutions.

BRIEF SUMMARY

There is disclosed herein a method of encoding an image file, the method comprising inputting dimension, channel, bit depth and color model data of the image file; forward transforming the image file; entropy coding the image file; inverse transforming the image file; and, reconstructing the image file.

In another disclosed aspect, the inputting comprises populating channel data.

In another disclosed aspect, the forward transforming comprises a plurality of transformations.

In another disclosed aspect, the inverse transforming comprises a further plurality of transformations.

In another disclosed aspect, the reconstruction is to facilitate display of the image file on the display surface of a user device.

In another disclosed aspect, the user device comprises a phone, tablet, desktop computer, laptop computer, or watch.

There is also disclosed herein methods comprising conversion from an image file having a JPG format to the image having a format as disclosed herein.

There is also disclosed herein computer implemented versions and versions comprising computer readable media encoded with instructions for completing the steps of, the methods disclosed herein.

BRIEF DESCRIPTION OF THE FIGURES

Embodiments are illustrated by way of example in the accompanying figures, in which.

DETAILED DESCRIPTION

Figure 1:
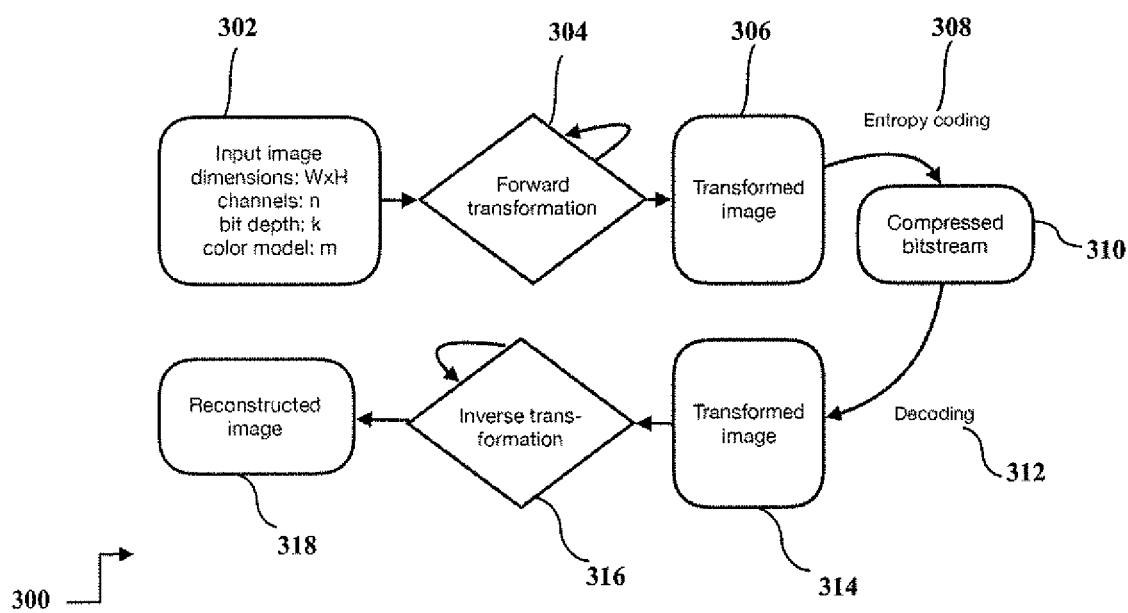
FIG. 1 is a flow diagram of a method of image transformation.

There is disclosed herein system and methods pertaining to a Free Universal Image Format ("FUIF"). FUIF is a substantially universal image format in multiple senses. First, FUIF works with any kind of image. By way of contrast, JPEG works well for photographic images and PNG may be better for non-photographic images (e.g. screen content). Having different file formats (or different subformats within one file format, e.g. lossy WebP and lossless WebP) for different kinds of images has obvious disadvantages. Different image content does require different compression techniques, but in FUIF these different techniques correspond to different image transformations (e.g. Palette+ Match vs YCoCg+Squeeze) that can be used within the same format. Further, FUIF has substantially no inherent limitations in terms of maximum image resolution, bit depth or number of channels—certainly, practical implementations will have some limits if only for security and performance reasons; but these limits do not flow form the format itself. So, this format would support larger items such as, for example, 20-bit CMYK with an alpha channel and a depth channel.

Still further, FUIF works with substantially any quality of image, from very low bitrates to lossless. For one-to-many delivery, it may be acceptable to spend a lot of time to encode an image. In other use cases, a fast and predictable encode time is desired or required. FUIF provides for a modular approach in both its internal image transformations and its entropy coding, which makes it possible to obtain a wide spectrum of trade-offs between encode time and compression density. FUIF provides for storing pixels and the metadata needed to render an image, but that is it. Additional data, like Exif metadata, comments, rotation, crop coordinates, layers, tiling, image sequences, animations, and so on is a task for the container format (e.g. HEIF), not for the image format. This is a matter of separation of concerns, as well as avoiding duplication of functionality.

Responsive by Design

One single file may be used instead of having to downscale a high-resolution original to various target resolutions. The bitstream does not require seeking and a meaningful placeholder/preview can be shown from the first few hundred bytes. The header of a FUIF image file may contain a mandatory list of truncation offsets, which facilitates determining how many bytes should be requested or served. The following offsets may be example of ones included in the header:

a) LQIP: the first very low-quality preview of an image (typically at 100-200 bytes);

b) scale 1:16;

c) scale 1:8;

d) scale 1:4; and, e) scale 1:2.

These power-of-two downscales are exact, in the sense that if one truncates the file at the given offset, the resulting image is the same as decoding the whole full-resolution image and then downscaling it. Any truncation after the LQIP offset produces a valid file that when decoded has an amount of detail that is in between that of the two nearest offsets. So if, for example, a scale 1:3 image is needed, a web browser could pick a truncation point heuristically: e.g. when the image is not yet visible, it could start by downloading until the scale 1:4 threshold (so it can immediately show an upscaled image if the user scrolls down and the image suddenly becomes visible), then depending on the network speed and user preferences (e.g. "Save Data"), pick some offset somewhere between the scale 1:4 and scale 1:2 offset (so it will most likely get some more luma details). If the user looks at the image for a while, or starts to zoom in on it, the browser may then request even more bytes, perhaps even the whole file.

FUIF provides for a minimalistic, compact header layout, so the first bits of actual image data appear substantially as early as possible. This makes it possible to get a LQIP within a small byte budget, while it is still the beginning of the actual full image, so you also get the actual image dimensions, truncation offsets, etc.

Legacy-Friendly

There is a huge amount of existing JPEG images, as well as devices that produce new JPEG images. If the only way to transcode a JPEG image to a new image format, is to decode the JPEG to RGB pixels (or even to YCbCr) and encode that to the new format, then there is a significant problem. Possible results include significant generation loss, or new files that are actually larger than the original.

FUIF is "compatible" with JPEG, in the sense that it supports the 8×8 DCT transform (which is inherently lossy due to rounding errors) and the YCbCr color transform (which is also inherently lossy for the same reason). This means it can substantially losslessly represent the actual information in a JPEG image, while still adding most of the benefits of FUIF such as, for example:

a) LQIP and scale 1/16 (progressive JPEG starts at scale 1/8);

b) Minimal header overhead; and, c) Better entropy coding.

Unlike JPEG XT, the FUIF bitstream is completely different from legacy JPEG, so it may not be fully backwards compatible therewith (i.e., it cannot necessarily be read by existing JPEG decoders). But existing JPEG images can be converted substantially losslessly and effectively to FUIF, including in some embodiments with added information like alpha or depth channels. Full backwards compatibility is in some circumstances convenient; but, it can also have drawbacks. It implies that the compression density cannot be improved. Further, the new features (like e.g. alpha or higher bit depth) are not guaranteed to be rendered correctly, since (at least initially) most decoders will ignore any extensions of the legacy JPEG bitstream. So, there are at least some advantages to not being entirely backwards compatible.

FIG. 1 illustrates a non-limiting example of a high-level encode/decode process 300 disclosed herein. A FUIF input image 302 has an arbitrary width and height, an arbitrary number of channels, an arbitrary bit depth, and a color model. All channels have the same dimensions and bit depth. Pixel values are unsigned integers. The color model together with the number of channels determine the semantics of the channels (e.g. the color primaries and transfer function).

A sequence of transformations (e.g., 304) can be applied to the input image. All transformations are optional. Transformations may increase or decrease the number of channels, their dimensions, and the ranges of the pixel values. The resulting transformed image 306 is then entropy encoded 308, channel by channel, in scanline order. To decode an image, the transformed image 314 may be decoded 312 and the inverse transformations 316 applied to obtain the reconstructed image 318.

A FUIF image file starts with a header that contains basic metadata like image dimensions, bit depth and color space. Then the header contains a list of offsets. These offsets are truncation points to obtain downscaled (or lower quality) previews of the image.

| A1 | A2 | B1 | B2 | C1 | C2 | D1 | D2 | ... | Z1 |
|----|----|----|----|----|----|----|----|-----|----|

The corresponding 'squeezed' row may appear as follows:

| A = (A1 + A2) >> 1 | B = (B1 + B2) >> 1 | C = (C1 + C2) >> 1 | D = (D1 + D2) >> 1 | ... | Z = Z1 |
|---|---|---|---|---|---|

Finally, the sequence of transformations are described, in the order in which they were applied at encode time. The decoder has to use this information to update the channel metadata, which gets changed by most transformations. After decoding the transformed image, it applies the reverse transformations—it does not necessarily have to apply all of them, e.g. in some applications it can stop early and use YCbCr 4:2:0 or palette-indexed channels directly.

Transformations can require two kinds of parameters: parameters that are included in the header, and parameters that are encoded as a new (meta-)channel which gets inserted in the beginning of the channel list. The list of transformations and their parameters are explicitly encoded in the bitstream 310. As a result, many different combinations of transformations can be used by an encoder, resulting in a flexible and modular image format.

Transformations

Table 1 shows examples of transformations (e.g., 304, 316) that may in some embodiments be applied:

| ID | Name | Description |
|----|------|-------------|
| 0 | YCbCr | Color transformation (same as in JPEG) |
| 1 | YCoCg | Reversible color transformation (range extending in the Co, Cg channels) |
| 2 | RCT | Parametrized, non-range extending reversible color transformation |
| 3 | Subsample | (Chroma) subsampling |
| 4 | DCT | 8 × 8 Discrete Cosine Transform (same as in JPEG) |
| 5 | Quantize | Quantization. |
| 6 | Palette | Reduce one or several channels to a palette of colors and a palette index channel |
| 7 | Squeeze | Nonlinear Haar-like transform |

The above comprises an example sequence of transformations and the present disclosure is not limited merely to the same but rather permits sequencing in arbitrary or defined ways.

Transformation 7: Squeeze

The squeeze transformation consists of a repeated application of a Haar-like transform. In each step, a channel gets replaced by two new channels: one 'squeezed' channel which effectively contains the downscaled original channel (where either the horizontal or the vertical dimension gets halved), and one that contains the 'residual' values which are needed to reconstruct the original channel.

The horizontal squeeze step is explained in detail and it is noted that aspects of the vertical squeeze are analogous.

Given a W×H input channel, there are two output channels: a [W/2]×H 'squeezed' channel, and a [W/2]×H 'residual' channel. Consider one row of pixels of the input channel:

That is, two neighboring pixels become one pixel with a value that is the average of the two, except we use (arithmetic) bitshift instead of division by two, which means the values are always rounded down (also when the input numbers are negative).

The 'residual' row may appear as follows:

| (A1 − A2) − | (B1 − B2) − | (C1 − C2) − | (D1 − D2) − | ... |
|---|---|---|---|---|
| T(A, A, B) | T(A2, B, C) | T(B2, C, D) | T(C2, D, E) | |

The terms T(_,_,_) only depend on information that is available when doing the inverse transformation; they attempt to predict the differences in smooth areas, so the residuals become (closer to) zero. Without this predictor term, quantizing or dropping the residual channel would cause strong pixelation.

In the reverse transform, the original channel can be reconstructed as follows. Given the average b=(b1+b2)>>1 and the difference (b1−b2), we can use the fact that the sum b1+b2 and the difference b1−b2 must have the same least-significant bit, so we can reconstruct the exact sum and the exact original values b1 and b2:

```
sum = (b << 1)
     +((b1 − b2)&1)
b1 = (sum +
     (b1 − b2)) >> 1
b2 = b1 − (b1 − b2)
```

| | b | c |
|---|---|---|
| a | b1  b2 | |

The 'tendency' term T(a,b,c) aims to predict the difference b1−b2 in the diagram above. Linear interpolation of b1 and b2 from their nearest available neighbors results in b1≈(a+2b)/3 and b2≈(c+3b)/4, so b1−b2≈(4a−3c−b)/12. The exact definition of T(a,b,c) may be, in some embodiments, as follows:

```
if (a ≥ b ≥ c) {
    int d = (4a − 3c − b + 6)/12;
    if (d + (d&1) > 2(a−b)) d = 2(a−b);
    if (d − (d&1) >
2(b−c)) d = 2(b−c) − 1;
    return d;
} else if (a ≤ b ≤ c) {
    int d = (4a − 3c − b − 6)/12;
    if (d + (d&1) < 2(a−b)) d = 2(a−b) − 1;
    if (d − (d&1) < 2(b−c)) d = 2(b−c); return d;
} else return 0;
```

This predictor preserves monotonicity and produces interpolated values when there is local monotonicity (e.g. if there is a smooth gradient). If there is no local monotonicity, it predicts a zero difference; any non-zero difference would potentially exaggerate the local minimum or maximum and put it in an arbitrary location. See Table 2 below for examples:

| | | | |
|---|---|---|---|
| a = 10 | b = 25 | c = 45 | |
| | 20 | 30 | using T(a, b, c) |
| a = 10 | b = 50 | c = 20 | |
| | 50 | 50 | using T(a, b, c) |
| | 47 | 53 | using (4a − 3c − b)/12 |
| a = 10 | b = 50 | c = 56 | |
| | 44 | 56 | using T(a, b, c) |
| | 43 | 58 | using (4a − 3c − b)/12 |

Figure 2:
FIG. 2 is a first variant of a test image.

As a result, when the residual channels are dropped (or quantized strongly, turning them into mostly zeroes), pixelation is avoided in smooth regions, while in the non-smooth regions, pixelation will be visible but overshoot/ringing is at least substantially avoided. An example to illustrate the behavior of the "tendency" term when multiple Squeeze steps are performed is provided below. Consider the image 400 shown as FIG. 2.

Figure 3:
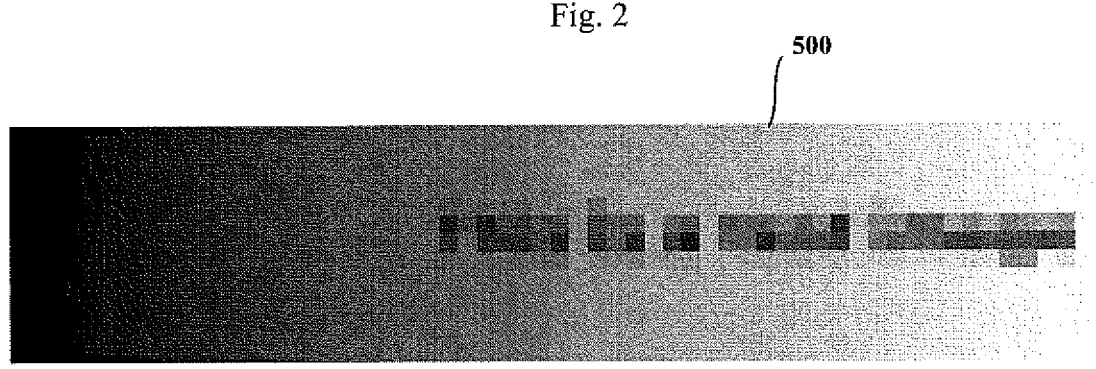
FIG. 3 is a second variant of the test image of FIG. 2.

Assume the image was squeezed using 8 squeeze steps (4 horizontal ones and 4 vertical ones), so the resulting "squeezed" channel corresponds to the image at scale 1:16. Then the actual available information is as shown 500 in FIG. 3 (shown here with nearest neighbor upscaling for clarity).

Figure 4:
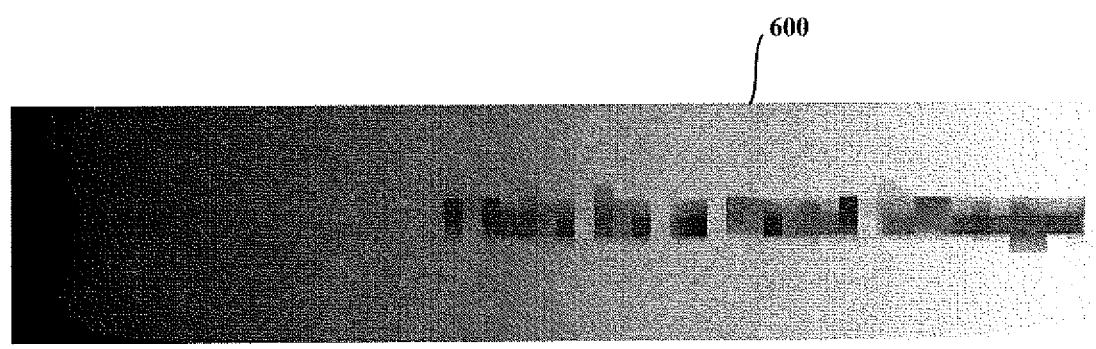
FIG. 4 is a third variant of the test image of FIG. 2.

Applying the reverse Squeeze transformation where all the remaining residual channels are cleared (i.e. all residuals are zero, so the differences are equal to the predicted differences), results in an image such as that shown 600 in FIG. 4.

Figure 5:
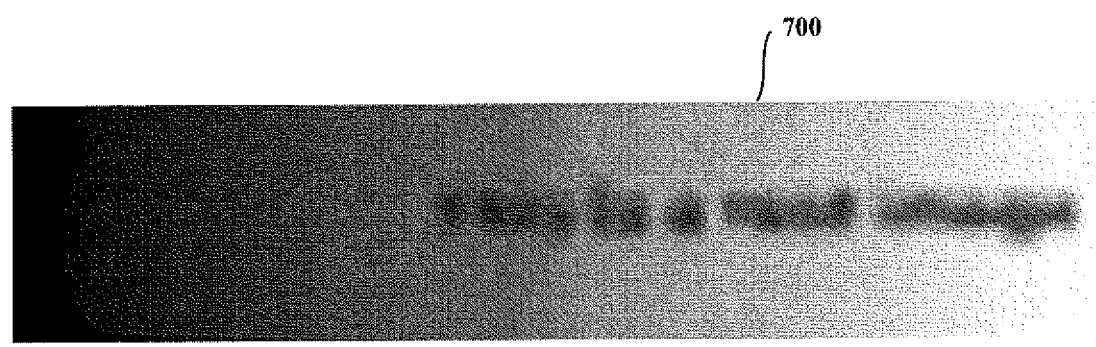
FIG. 5 is a fourth variant of the test image of FIG. 2.

Applying some standard upscaling algorithm would produce something different, for example, as shown 700 in FIG. 5.

In the regions of smooth transitions, there is not much difference between the two, but where there are sharp edges, standard upscaling filters introduce blur while the reverse squeeze transformation introduces pixelation.

The squeeze step is applied several times, alternating between horizontal and vertical squeeze steps. By default, the residual channels are left as-is; only the squeezed channels get squeezed further. The sequence of squeeze steps to be applied is defined by the transformation parameters; if no parameters are given, default parameters are used which are derived from the image dimensions and number of channels.

The parameters are as follows: [[step_ID] [begin_channel] [end_channel]]*. Channel numbers are absolute (so they can also refer to meta-channels).

The step_ID is defined as shown in Table 3:

| step_ID | Description |
|---|---|
| 0 | Vertical squeeze step, insert residuals after squeezed channels |
| 1 | Horizontal squeeze step, insert residuals after squeezed channels |
| 2 | Vertical squeeze step, insert residuals at the very end of the channel list |
| 3 | Horizontal squeeze step, insert residuals at the very end of the channel list |

The input channels are replaced by the squeezed channels, and the residual channels are inserted at the position determined by the step_ID.

The default parameters are as follows: If the image has at least 3 channels and they have the same dimensions, then first do a horizontal and then a vertical squeeze on channels 1 and 2, putting the residuals at the very end. These channels presumably contain chroma, so this effectively corresponds to 4:2:0 chroma subsampling if these residuals are truncated. If the number of channels is at least 3 and there are no meta-channels, the default parameter sequence starts with 3, 1, 2, 2, 1, 2.

Then an alternating sequence of horizontal and vertical squeeze steps is applied to all channels. The sequence starts with a horizontal step if the image width is (strictly) larger than the image height, and it starts with a vertical step otherwise. The sequence of squeeze steps ends when the dimensions of the first squeezed channel (presumably luma) are smaller than 8×8 (both width and height are at most 8).

Figure 6:
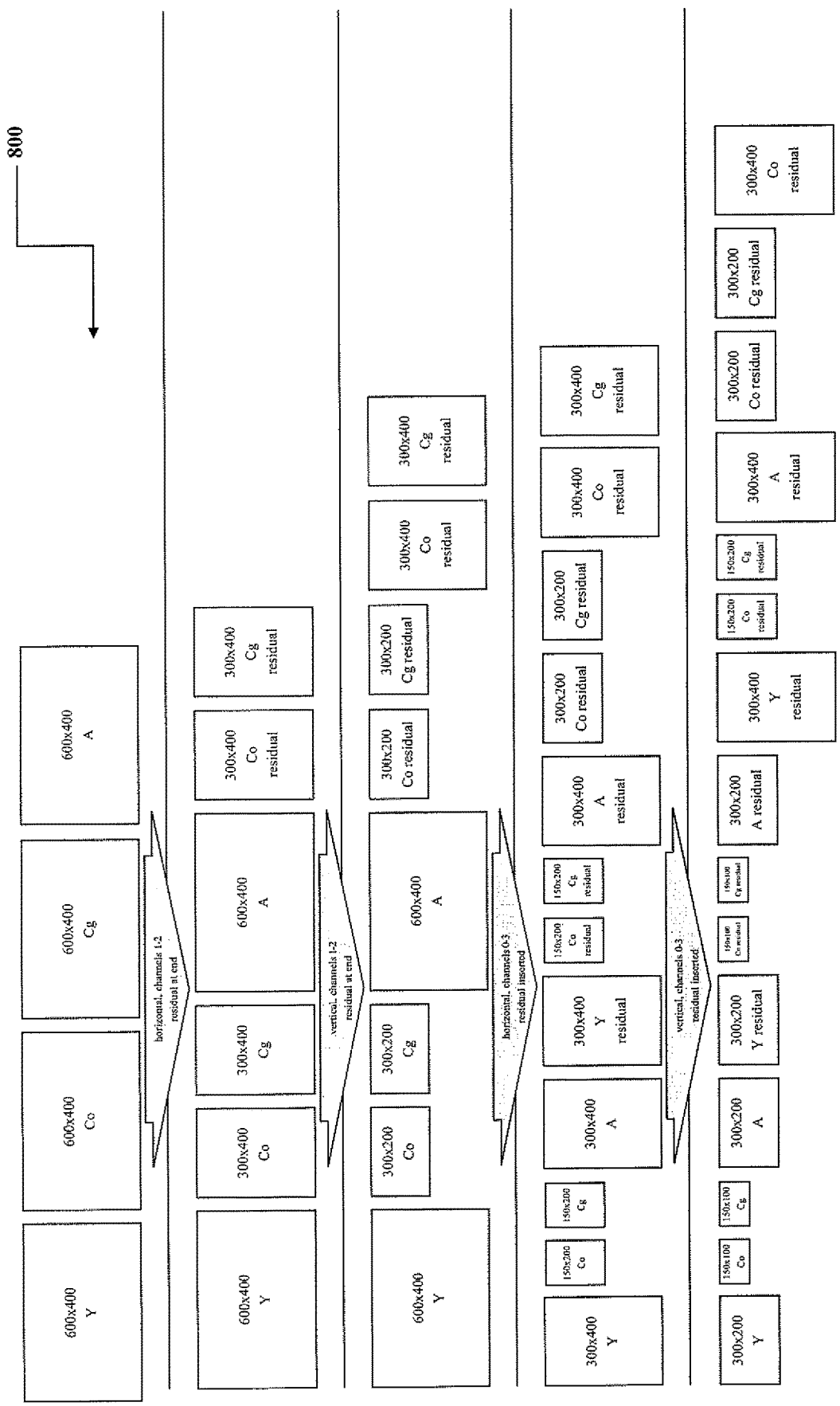
FIG. 6 is a further flow diagram showing an image transformation process.

To illustrate the default squeeze parameters, FIG. 6 shows the first few steps of the default parameters 800 applied to a 600×400 four-channel image.

Transformation Sequences

A transformation sequence can consist of any of the transformations described above, in any order. The same transformation can in general be applied multiple times (e.g. with different parameters).

There are many possible combinations of transformations. To encode an existing JPEG image, the transformation sequence can be started with the sequence YCbCr, (Subsample), DCT, Quantize. The quantized DCT coefficients of the input image can then be used directly (instead of decoding the image to RGB pixels and starting from there, which would be less effective), and encoding may proceed from there. For example, a default Squeeze transformation can be applied, which will squeeze the scale 1:8 image (DC), in order to get a more progressive decoding (1:16, 1:32, a quick LQIP).

Channel Encoding

After the header is encoded, the actual channel data gets encoded. Note that because of the transformations, the number of channels can be different from the original number of channels of the image, and the dimensions of each channel can be different from the image dimensions. At decode time, this information is available since it can be derived from the image properties and the transformation sequence. So there is no particular need to encode the actual channel count, nor the dimensions of each channel.

The actual pixel data in the channels can be encoded using various predictors and entropy coding mechanisms, in order to achieve various speed vs density trade-offs. Examples of predictors include Left, Top, Average(Left, Top), Median (Left, Top, Left+Top−Topleft), etc.

Examples of entropy coders include Huffman, Deflate, Brotli, Asymmetric Numeral Systems (ANS), Context-Adaptive Binary Arithmetic Coding (CABAC), Meta-Adaptive Near-zero Integer Arithmetic Coding (MANIAC), etc.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided as organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

The invention claimed is:

1. A method of encoding an image file, the method comprising:
   a) inputting dimension, channel, bit depth and color model data of the image file;
   b) forward transforming the image file;
   c) entropy coding the image file;
   d) inverse transforming the image file; and,
   e) reconstructing the image file;
   wherein the forward transforming comprises at least one squeeze transformation, wherein the squeeze transformation comprises a plurality of modified Haar transformations, wherein in each of the modified Haar transformations, the data of one of the channels is replaced by two new channels,
   wherein one of the two new channels is a squeezed channel and the other of the two new channels is a residual channel, wherein the squeezed channel contains the downscaled original channel, wherein in the downscaled original channel, either the horizontal or the vertical dimension has been halved, and wherein the residual channel contains residual values necessary to reconstruct the original channel;
   wherein the at least one squeeze transformation comprises a plurality of squeeze transformations, wherein a corresponding squeezed row of pixels comprises:

$$A = (A1 + A2) \gg 1 \quad B = (B1 + B2) \gg 1 \quad C = (C1 + C2) \gg 1 \quad D = (D1 + D2) \gg 1 \ldots Z = Z1$$

and, wherein a corresponding residual row of pixels comprises:

$$(A1 - A2) - T(A, A, B) \quad (B1 - B2) - T(A2, B, C) \quad (C1 - C2) - T(B2, C, D) \quad (D1 - D2) - T(C2, D, E) \quad \ldots$$

2. A method according to claim 1, wherein the reconstruction is to facilitate display of the image file on the display surface of a user device.

3. A method according to claim 2, wherein the user device comprises a phone, tablet, desktop computer, laptop computer, or watch.

\* \* \* \* \*